(12) United States Patent
Tone et al.

(10) Patent No.: US 6,633,516 B2
(45) Date of Patent: Oct. 14, 2003

(54) ZCAV OPTICAL AND METHOD FOR ACCESSING THEREOF

(75) Inventors: Yasuo Tone, Tokyo (JP); Hideo Tada, Tokyo (JP)

(73) Assignee: Sony Corporation, Tokyo (JP)

( * ) Notice: Subject to any disclaimer, the term of this patent is extended or adjusted under 35 U.S.C. 154(b) by 142 days.

(21) Appl. No.: 09/885,740

(22) Filed: Jun. 20, 2001

(65) Prior Publication Data

US 2001/0055245 A1 Dec. 27, 2001

(30) Foreign Application Priority Data

Jun. 21, 2000 (JP) ..................................... P2000-186810

(51) Int. Cl.[7] .............................................. G11B 21/08
(52) U.S. Cl. .................................. 369/30.12; 369/275.3
(58) Field of Search ............................. 369/275.3, 30.1, 369/30.12, 47.15, 47.23, 275.4, 44.26, 47.22

(56) References Cited

U.S. PATENT DOCUMENTS

| 5,859,820 A | * | 1/1999 | Nagasawa et al. | ............ 369/48 |
| 5,862,112 A | * | 1/1999 | Nagai et al. | ................... 369/48 |
| 5,867,474 A | * | 2/1999 | Nagasawa et al. | ....... 369/275.3 |
| 5,936,932 A | * | 8/1999 | Nakane et al. | ........... 369/275.3 |
| 6,064,643 A | * | 5/2000 | Tanoue et al. | ........... 369/275.3 |
| 6,091,688 A | * | 7/2000 | Tanoue et al. | ................. 369/59 |

* cited by examiner

*Primary Examiner*—Tan Dinh
(74) *Attorney, Agent, or Firm*—Frommer Lawrence & Haug LLP; William S. Frommer; Bruno Polito

(57) ABSTRACT

Pieces of address information are recorded on an optical disc such that they are successively continuous addresses within each zone but discontinuous at a beginning of a zone next to the previous zone, and an address after repeating the addresses of the previous zone for two rounds becomes the forefront address of the zone next to the previous zone. Access to the land tracks is performed by returning to the first address position in a zone after the addresses of the groove tracks become the last address of the zone, and the access is performed by recognizing an address continued from the last address of the groove tracks suppositionally on the pieces of address information recorded on the groove tracks, and then the access is successively performed to move to the next zone after the addresses of the land tracks become the last address of the zone.

4 Claims, 9 Drawing Sheets

FIG.10

| | |
|---|---|
| ZONE 0 (GROOVE) | GROOVE TRACK 0, SECTOR 0 |
| | GROOVE TRACK 0, SECTOR 1 |
| | ⋮ |
| | GROOVE TRACK N-1, SECTOR n-1 |
| ZONE 0 (LAND) | LAND TRACK 0, SECTOR 0 |
| | LAND TRACK 0, SECTOR 1 |
| | ⋮ |
| | LAND TRACK N-1, SECTOR n-1 |
| ZONE 1 (GROOVE) | GROOVE TRACK 2N, SECTOR 0 |
| | GROOVE TRACK 2N, SECTOR 1 |
| | ⋮ |
| | GROOVE TRACK 2N+M-1, SECTOR n-1 |
| ZONE 1 (LAND) | LAND TRACK 2N, SECTOR 0 |
| | LAND TRACK 2N, SECTOR 1 |
| | ⋮ |
| | LAND TRACK 2N+M-1, SECTOR n-1 |
| ZONE 2 (GROOVE) | GROOVE TRACK 2N+2M, SECTOR 0 |
| | ⋮ |

ZCAV OPTICAL AND METHOD FOR ACCESSING THEREOF

RELATED APPLICATION DATA

This application claims priority to Japanese Patent Application JP 2000-186810, and the disclosure of that application is incorporated herein by reference to the extent permitted by law.

BACKGROUND OF THE INVENTION

1. Field of the Invention

The present invention relates to an optical disc in conformity with so-called zone constant angular velocity (ZCAV) system, an access method of the optical disc and a drive of the optical disc.

2. Description of the Related Art

As a recording format of an optical disc, a constant linear velocity system (hereinafter, referred to as "CLV system") and a constant angular velocity system (hereinafter, referred to as "CAV system") are conventionally well known.

The CLV system is a system in which a spindle motor is controlled so that rotational speeds thereof are inversely proportional to radii of tracks provided on an optical disc. In the CLV system, linear velocities of tracks to be recorded or reproduced become constant at any position on the optical disc, and the sector lengths and the recording/replaying frequencies of the tracks become constant throughout the whole gamut of the optical disc, and consequently the recording capacity of the optical disc can be enlarged. However, the CLV system has a problem such that the circuit system implementing the system becomes complex.

On the other hand, the CAV system is a system in which the rotations of a spindle motor and the recording/replaying frequencies used in the system are severally made to be constant, and thereby the circuit system implementing the CAV system can be simplified. However, because density of the data that can be recorded on the most inside track is small, the recording capacity of the whole optical disc becomes small.

For resolving the problem of recording capacity in the CAV system, the ZCAV system was proposed. The ZCAV system has the following features. That is, the ZCAV system makes most of the advantage of the CAV system that the rotation control is easy, and divides the whole recording area of an optical disc into a plurality of zones in a radius direction and increases the recording/replaying frequency in each zone by stages from the inner periphery side to the outer periphery side of the optical disc, and thereby increases the recording capacity of the optical disc.

FIGS. 7A and 7B are views for illustrating a recording mode of an optical disc in conformity with the ZCAV system. As shown in FIG. 7A, the whole recording area of the optical disc is divided into a plurality of zones, e.g. four zones Za-Zd in the example of the figure, in a radius direction. The disc rotational speed in each of the zones Za-Zd is controlled in conformity with the CAV control, and a recording/replaying frequency of each of the zones Za-Zd is made to be a prescribed constant frequency within the zone. However, the outer the zone is situated, the faster the rotational speed of the zone becomes and the higher the recording/replaying frequency of the zone becomes, and further the faster the accessing speed to the zone also becomes.

Then, in a plurality of tracks in each zone, a plurality of sectors, namely sectors Sa-Sd in the figure, are formed so as to align in radius directions.

As shown in FIG. 7B, in the leader Ga of each sector, a servo pit for tracking is formed, and address information is previously formatted (pre-pit) therein. Angle intervals of the formed pre-format parts in the respective sectors are fixed at every zone because the sectors are aligned in the radius directions at every zone as described above. Moreover, data is recorded in the data area Gd in each sector.

Incidentally, because the pre-format parts are not aligned in a radius direction at the boundaries in two adjoining zones, no-recording area ranging at least two tracks are formed lest address information should be mixed with recording signals or reproducing signals to exert a bad influence on the operation of a phase-locked loop (PLL) or other elements when an adjoining track in another zone is scanned.

Now, for making an optical disc of the ZCAV system have a larger recording information quantity, an optical disc was proposed in which lands Ln and grooves GR, both having substantially the same width and adjoining to each other and further being used as recording tracks severally, were spirally formed as shown in FIG. 8.

In this case, address information is recorded in order that the address information can be utilized by both of the groove tracks and the land tracks. FIG. 9 shows one example of recording of the address information, in which two pieces of address information ID1, ID2 are recorded by pre-pitting at the positions shifted like a check pattern in a direction perpendicular to a groove track GrT and a land track LnT.

In this case, the two pieces of address information ID1, ID2 are recorded so that, when a light beam scans the groove track GrT, the two pieces of address information ID1, ID2 become equal in each pre-format part and the two pieces of address information ID1, ID2 change continuously at every pre-format part.

Consequently, when a light beam scans the groove track GrT, the two pieces of address information ID1, ID2 that are equal to each other can successively be obtained from each pre-format part. On the other hand, when the light beam scans the land track LnT, the two pieces of the address information ID1, ID2 different from each other can be obtained from each pre-format part.

As described above, in the address areas of the groove tracks, the track address information is conventionally recorded so as to be continuous over the whole area of an optical disc, i.e. over a plurality of zones.

Accordingly, in the data recording method into such a kind of optical disc, an access method is adopted in which data is recorded in the groove tracks over all of the zones at first, and then the data is recorded in the land tracks from aspect of the track addresses continuity.

However, such an access method is very inefficient. That is, for example, in case of accessing from the outermost periphery side zone successively, when the recording to the groove track in the zone Za on the outermost periphery side has been completed, the zone is changed so that the groove track in the zone Zb, in which access speed is lower, on the inside of the zone Za, to which high speed accessing is possible, on the outermost periphery side, is accessed although vacant land tracks to which the data has not been recorded yet exist in the zone Za.

Moreover, at each time of the access to the groove tracks and the access to the land tracks, the change of a zone becomes necessary by the number of zones. Consequently, the access speed becomes slower owing to the large number of times of the changes.

Moreover, the correspondence between the addresses of the groove tracks and the addresses of the land tracks could conventionally not be distinguished only by looking at the track addresses, and some means for distinguishing between the groove tracks and the land tracks was necessary.

That is, if the addresses of the groove tracks and the addresses of the land tracks in each zone of an optical disc of this type are indicated by track addresses (or track numbers) and sector addresses (or sector numbers), they become ones as shown in FIG. 10.

SUMMARY OF THE INVENTION

As shown in FIG. 10, if the track numbers and the sector numbers are traced by the groove track or by the land track, the track numbers and the sector numbers are continues addresses, and then the track in each zone can be distinguished. However, the track numbers and the sector numbers of the groove tracks and the land tracks in the same zone become the same. Consequently, the sectors in the groove tracks and the sectors in the land tracks cannot be distinguished only by the track numbers and the sector numbers, and means for distinguishing the grooves and the lands becomes necessary.

An object of the invention is to provide an optical disc that can efficiently be accessed and both of the groove tracks and the land tracks of which can be distinguished only by means of their track numbers even if the optical disc uses both of the groove tracks and the land tracks and the pre-format of the same addresses is performed on both of the groove tracks and the land tracks. The present invention also aims to provide an access method of such an optical disc and a drive apparatus of such an optical disc.

According to one embodiment of the present invention, the foregoing and other objects and advantages are attained by an optical disc, which is divided into a plurality of zones in a radius direction, and on both of a land track and a groove track of which data can be accessed, and further on which pieces of address information are recorded so that a same piece of address information can be used for any tracks of the land track and the groove track, wherein the pieces of address information are recorded so that they are successively continuous addresses in each zone and they are discontinuous in order that an address jumping by addresses of a previous zone in an access order thereof becomes a forefront address of a zone next to the previous zone at a beginning of the zone next to the previous zone.

According to the optical disc having the aforesaid structure in accordance with the one embodiment of the present invention, the addresses of tracks between a certain zone and a previous zone thereof are made to be discontinuous by jumping by an amount of the addresses of the previous zone. Consequently, in the case where, after the access to, for example, a groove track in which address information is recorded is completed in the previous zone, next, the first address of a land track in the same zone is accessed, the aforesaid amount of jumped addresses can suppositionally be assigned as the addresses of the land tracks.

Then, if the addressing is set to move to a groove track in the next zone after the last address of the land tracks in a zone has been used, a suppositional addresses in the land tracks in the zone and the actual addresses in the groove tracks in the next zone become continuous, and consequently address administration becomes very easy to understand. Consequently, the efficient access operation in which a move to the next zone after all of the groove tracks and the land tracks in the same zone have been used can easily be performed.

Moreover, according to one embodiment of the present invention, an access method of an optical disc, which is divided into a plurality of zones in a radius direction, and on both of a land track and a groove track of which data can be accessed, and further on which pieces of address information are recorded so that a same piece of address information can be used for any track of the land track and the groove track, said pieces of address information being recorded so that they are successively continuous addresses in each zone and they are discontinuous in order that an address jumping by an amount of addresses of a previous zone in an access order thereof becomes a forefront address of a zone next to the previous zone at a beginning of the zone next to the previous zone, the method comprising the steps of: performing access to either of the land track and the groove track by means of the pieces of address information in each zone; returning to a first address position in a zone after an address in the either track becomes a last address of the zone; performing the access by recognizing an address being continued from a last address of the either track suppositionally on the pieces of address information as an address of another track of the land track and the groove track; and moving to a next zone after the address of the other track becomes a last address of the zone.

The access method having the aforesaid steps according to the one embodiment of the present invention, in each zone, accesses to, for example, a groove track at first, and then accesses to the first address of a land track in the same zone next after using the last address of the groove track in the zone.

In this case, the track addresses on the optical disc are set to be discontinuous between a certain zone and the next zone with a jump by an amount of the addresses of the certain zone, and addresses for the jumped amount can be assigned to the land tracks. Accordingly, the addresses of the land track are used by setting their addresses continuing from the last address of the groove tracks in the same zone suppositionally. Then, after the last address of the land track in the zone has been used, the access moves to the next zone.

Consequently, the access to be moved to the next zone after all of the groove tracks and the land tracks in a zone have been used becomes possible to be easily performed in correspondence with the track addresses.

As described above, according to embodiments of the present invention, recording in the groove tracks and the land tracks is possible, and addresses can be administrated only by means of two parameters concerning track addresses and sector addresses even in the case where addresses are shared among the groove tracks and the land tracks of an optical disc having the ZCAV format. Thereby, the efficient access can be performed.

BRIEF DESCRIPTION OF THE DRAWINGS

The above and other objects, features and advantages of the present invention will become more apparent from the following description of the presently preferred exemplary embodiments of the invention taken in conjunction with the accompanying drawings, in which:

FIG. 10 is a view for illustrating the address information of an example of the conventional optical disc.

DESCRIPTION OF THE PREFERRED EMBODIMENTS

Hereinafter, the attached drawings are referred while embodiments of an optical disc in accordance with the present invention and embodiments of a drive and an access method are described.

[Embodiment Of Optical Disc]

Figure 2A:
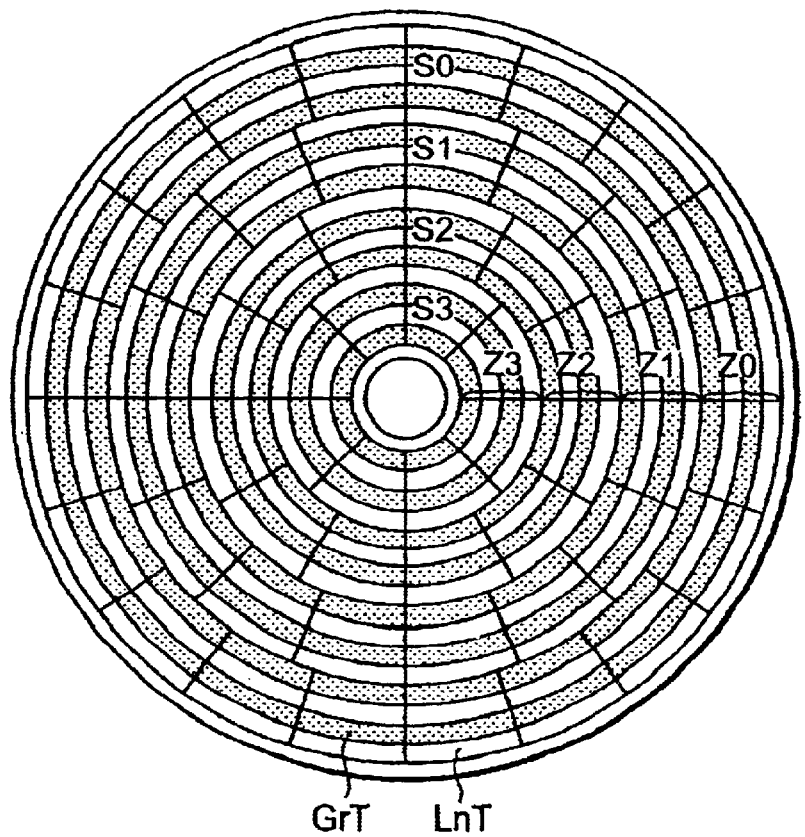
FIGS. 2A and 2B are views for illustrating the embodiment of the optical disc of the present invention.

An optical disc of the present embodiment has the ZCAV format having a plurality of zones, four zones Z0–Z3 in this example, divided in a radius direction similarly to the aforesaid conventional optical disc as shown in FIG. 2A. A plurality of sectors, sectors S0–S3 in the figure, are severally formed on a plurality of tracks in each zone so as to align in radius directions.

Figure 2B:
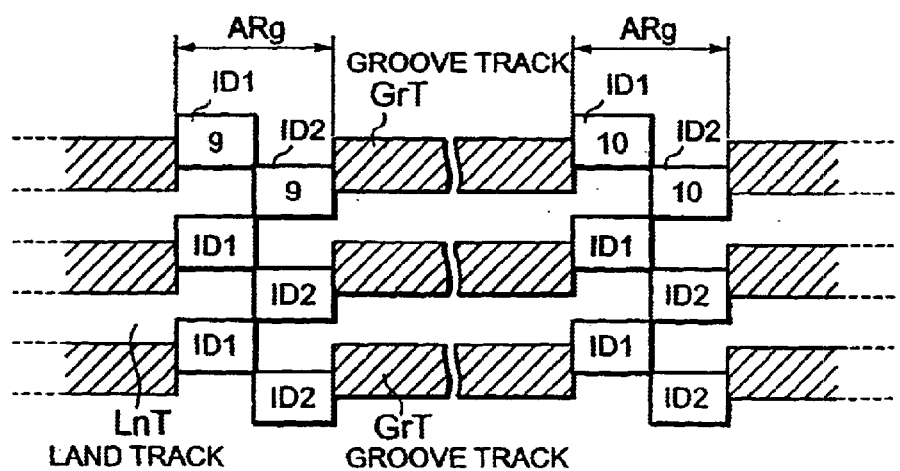

Then, as shown in FIG. 2A, land tracks LnT and groove tracks GrT (shown by being hatched in the figure) have severally separate spiral structure. As shown in FIG. 2B, two pieces of address information ID1, ID2 are recorded by pre-pitting at the positions shifted like a check pattern in the direction perpendicular to a groove track GrT and a land track LnT.

In this case, the two pieces of address information ID1, ID2 are recorded so that, when a light beam scans the groove track GrT, the two pieces of address information ID1, ID2 become equal in each pre-format part and the two pieces of address information ID1, ID2 change continuously at every pre-format part.

Figure 7A:
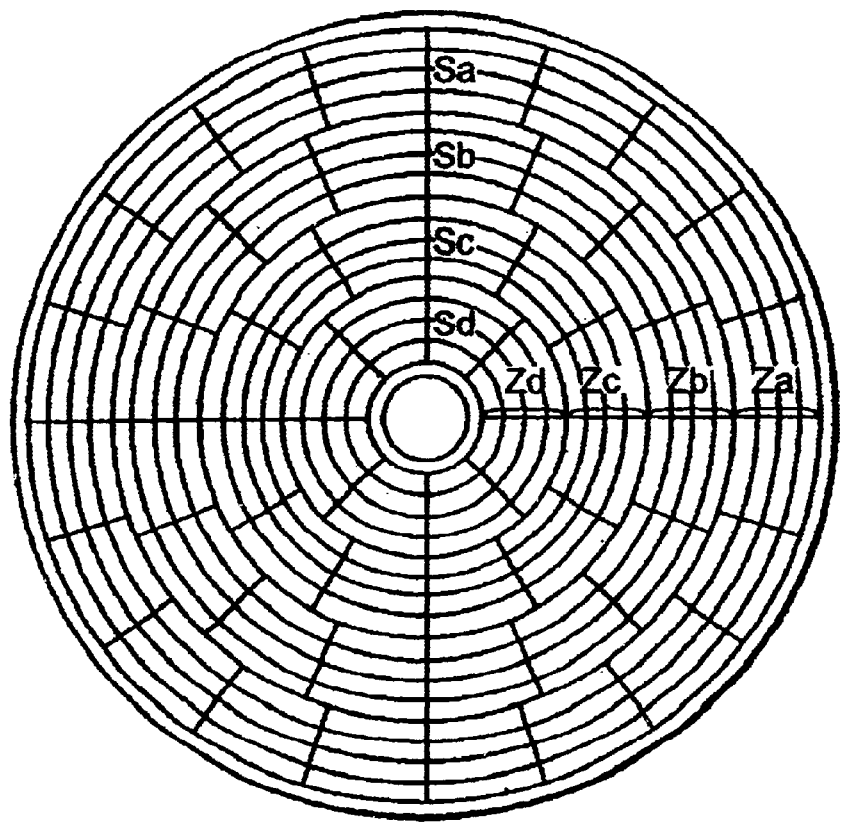
FIGS. 7A and 7B are views for illustrating a conventional optical disc in conformity with the ZCAV system.
Figure 7B:
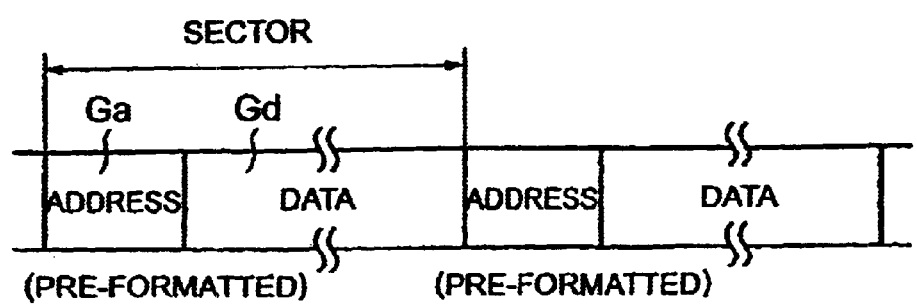
Figure 8:
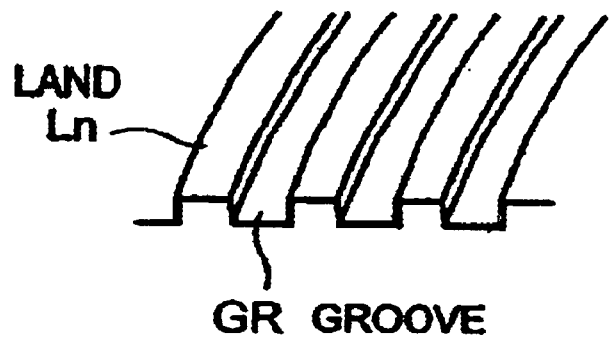
FIG. 8 is a view for illustrating groove tracks and land tracks of the conventional optical disc.
Figure 9:
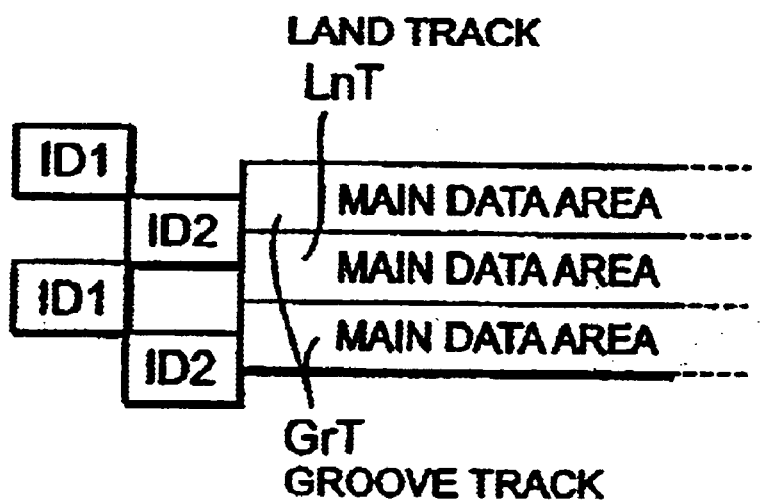
FIG. 9 is a view for illustrating address areas of the conventional optical disc.

The address area (the sector header) ARg where the two pieces of address information ID1, ID2 are recorded by the sector are set to be commonly used by a land sector and a groove sector similarly in the aforesaid. The data structure of the sector is completely the same as one shown in FIG. 7B.

Moreover, in this embodiment, one track is supposed to consist of n sectors from a sector No. 0 to a sector No. n−1. Moreover, it is supposed that the zone Z0 in the outermost periphery consists of N tracks, and that the zone Z1 inside the zone Z0 consists of M tracks, and that the zone Z2 inside the zone Z1 consists of P tracks, and that the zone Z3 inside the zone Z2 consists of Q tracks. Here, N, M, P, Q are severally a positive integer.

Although, in the conventional optical disc, track numbers continued over a plurality of zones are recorded in the address areas ARg, in the present embodiment, the track numbers are continuous within each zone, but discontinuous over two neighboring zones. The track numbers are recorded so that an address after the twice repetitions of addresses of the previous zone becomes the forefront address of the next zone as the access order.

Figure 1:
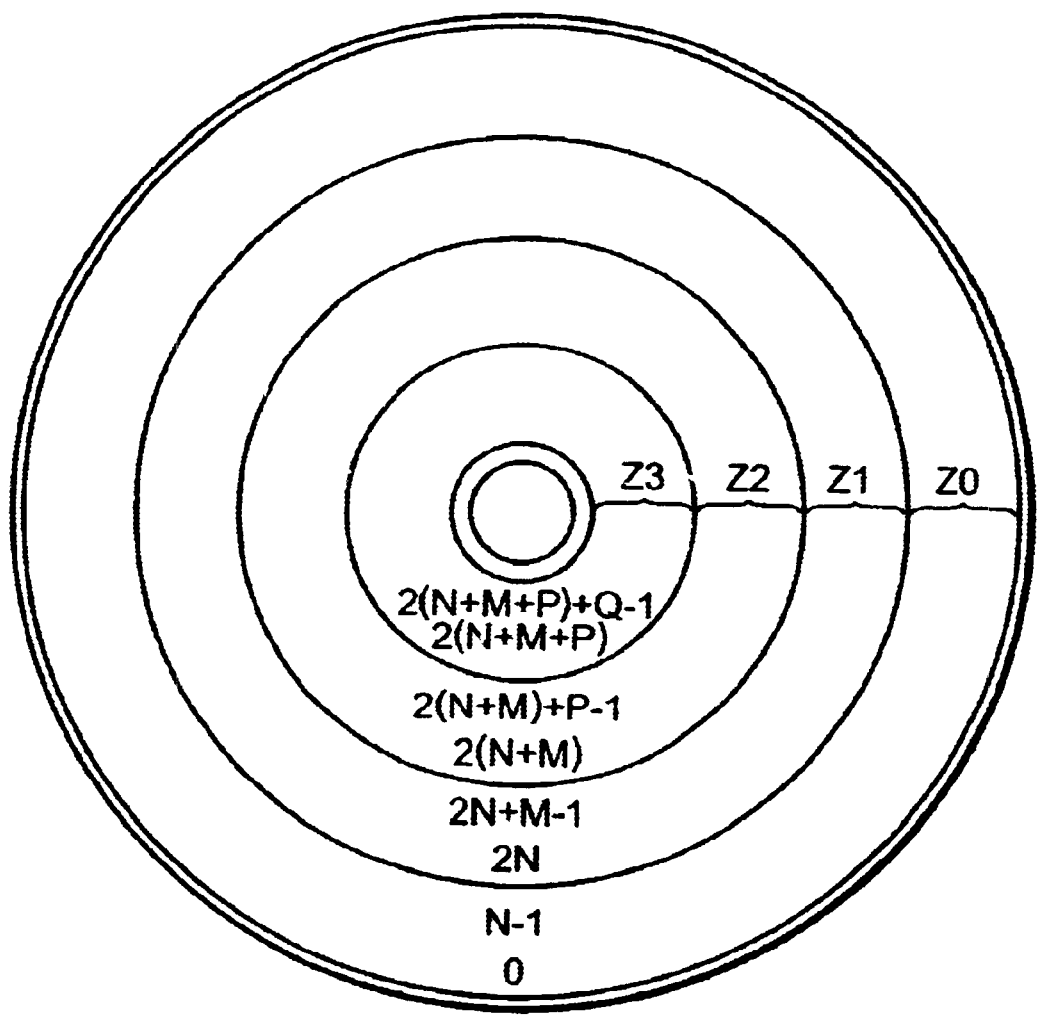
FIG. 1 is a view for illustrating an embodiment of an optical disc of the present invention.

That is, as shown in FIG. 1, the following track numbers are respectively recorded in respective address areas ARg of the groove tracks GrT of the following respective zones as pre-formats: track numbers 0 to (N−1) in the zone Z0 on the outermost periphery; track numbers 2N to (2N+M−1) in the zone Z1 inside the zone Z0; track numbers (2N+2M) to (2N+2M+P−1) in the zone Z2 inside the zone Z1; and track numbers (2N+2M+2P) to (2N+2M+2P+Q−1) in the zone Z3 inside the zone Z2.

As described above, in case of the optical disc of the ZCAV system of the present embodiment, if the access to the optical disc is performed so as to access the land tracks LnT in each zone after the access to the groove tracks GrT in the same zone, the access speed becomes higher to be efficient.

Figure 3:
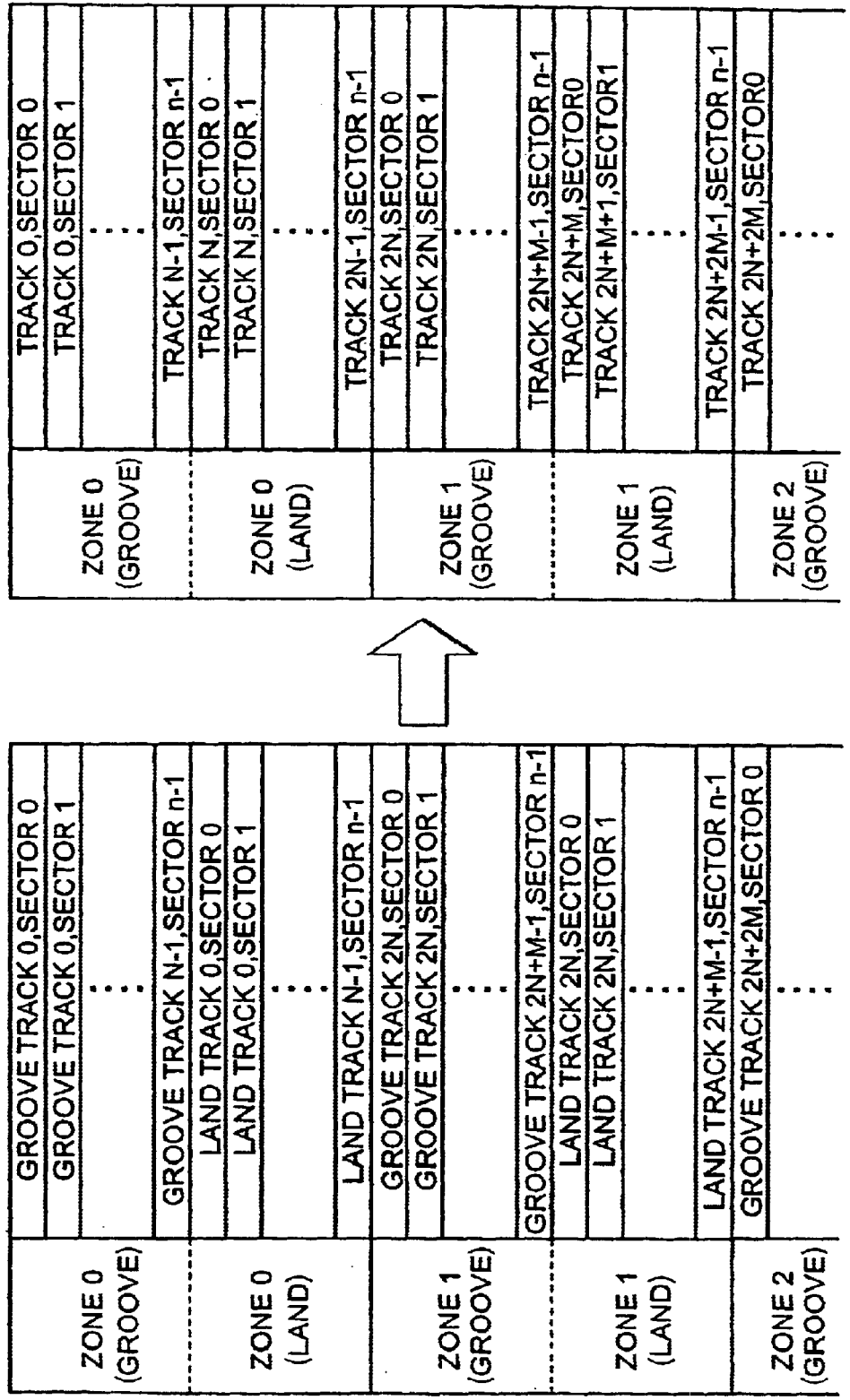
FIG. 3 is a view for illustrating address information of the embodiment of the optical disc of the present invention.

Consequently, the address information from the address areas ARg that are read out when sectors in the groove tracks GrT and the land tracks LnT in each zone are accessed in order, for example, from the zone Z0 in the outermost periphery becomes one as shown on the left side in FIG. 3.

If the access is performed as described above, the groove tracks GrT and the land tracks LnT cannot be distinguished in each zone only by means of the track numbers similarly in the conventional case. However, the address information in the address areas ARg in each zone in case of the present embodiment has a jump by a number of the tracks in each zone between respective zones.

Accordingly, using the leeway of the track numbers by the jump, the access method of the present embodiment, as shown on the right side in FIG. 3, suppositionally assigns track numbers continued to the last track number on the groove tracks GrT in each zone to the land tracks LnT.

Thereupon, as apparent from the table on the right side in FIG. 3, even though access is performed from the groove tracks GrT to the land tracks LnT in each zone in order and then the access moves to the next zone as follows: the grove tracks GrT in the zone Z0→the land tracks LnT in the zone Z0→the groove tracks GrT in the zone Z1→the land tracks LnT in the zone Z1→the groove tracks GrT in the zone Z2 . . . , although the optical disc is a disc in the ZCAV system and both of the grooves and the lands thereof can be accessed, the access order can be administrated by means of the continuous track numbers.

Consequently, the access with good efficiency can be performed and the sectors in the groove tracks GrT and the land tracks LnT in each zone become able to be easily administrated by the track numbers and the sector numbers.

That is, an address controller can administrate non-used addresses between the addresses in a certain zone and the addresses in the next zone by allocating them as the addresses in the land tracks LnT. Thereby, it becomes possible to perform the identifying of each zone Z0–Z3 and the identifying of the groove tracks GrT and the land tracks LnT in each zone only by using the track numbers and the sector numbers, and the sector administration becomes very easy.

[Embodiment of Drive of Optical Disc]

Figure 4:
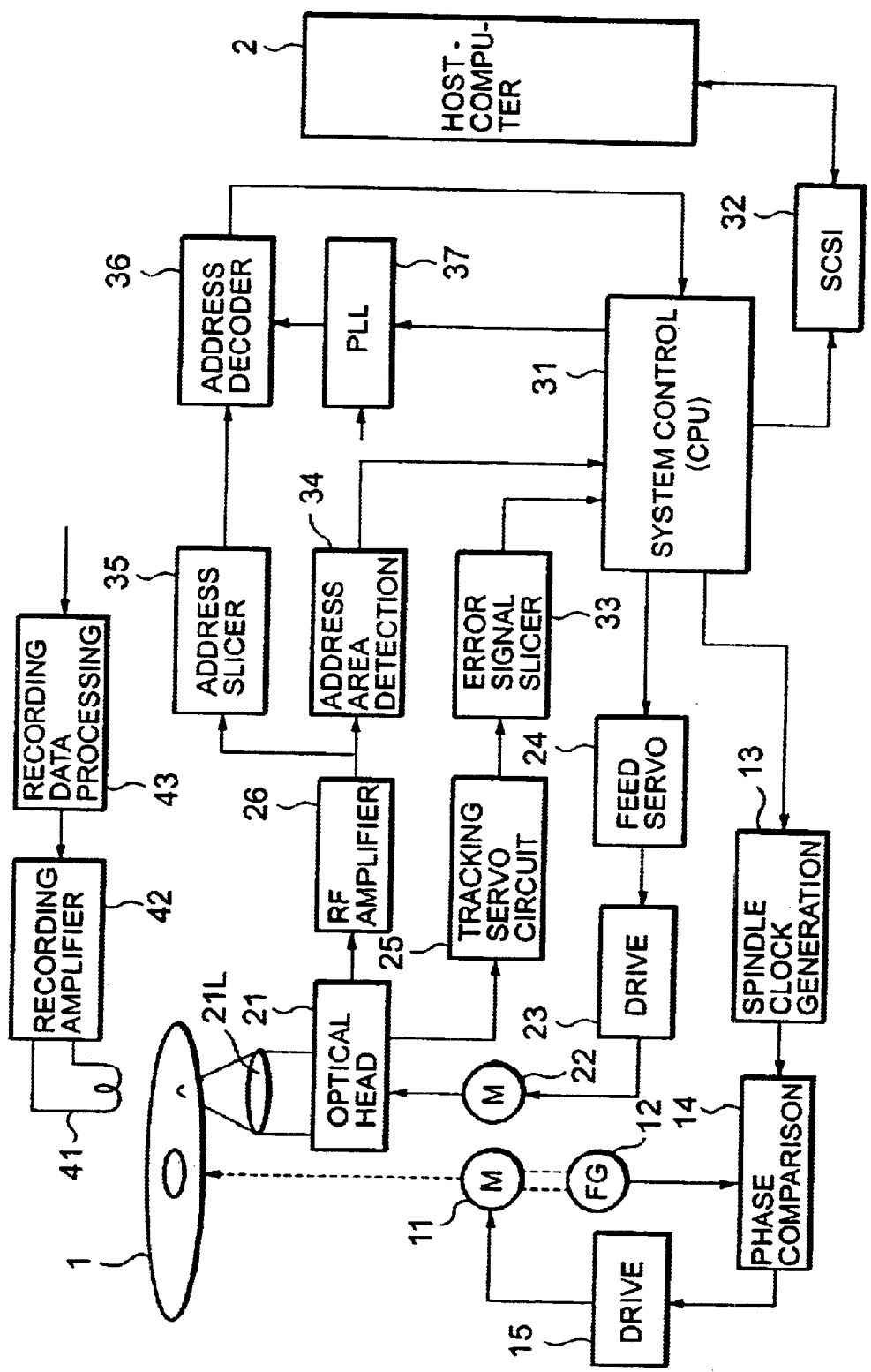
FIG. 4 is a block diagram showing an embodiment of a drive of an optical disc according to the present invention.

Next, the configuration of an embodiment of a drive of an optical disc according to one embodiment of the present invention for performing the read/write (recording/replaying) of the aforesaid optical disc is shown in FIG. 4.

In FIG. 4, an optical disc 1 is driven by a spindle motor 11. An output of a frequency generator (the so-called FG) 12 connected with the motor 11 and an output of a spindle clock generation circuit 13 are supplied to a phase comparison circuit 14. An output of the comparison circuit 14 is supplied to the motor 11 through a drive circuit 15 for performing the spindle servo control thereof. Then, the motor 11 rotates in the ZCAV mode.

An optical head 21 is structured to include an optical system, that includes a lens 21L and a beam splitter (not shown) and other equipments, and devices, which is not shown, such as a laser diode and a photo detector (light-sensitive detector) The optical head 21 is moved by a feed motor 22 in a radius direction of the optical disc 1.

On the opposite side to the optical head 21 with the optical disc 1 put between them, a recording magnetic head 41 is provided. Recording data is supplied to the recording magnetic head 41 through a recording data processing circuit 43 and a recording amplifier 42. The recording magnetic head 41 is moved by the feed motor 22 together with the optical head 21. The movement in the radius direction of the optical disc 1 is controlled by the supply of an output of a feed servo circuit 24 to the motor 22 through a drive circuit 23.

In the optical head 21, a tracking error signal is generated on the basis of an output of the photo detector, and is supplied to a tracking servo circuit 25 to perform the tracking control.

Moreover, a detected output of the photo detector in the optical head 21 is supplied to a radio frequency (RF) amplifier 26 to generate an RF signal as a reproduced signal of the optical disc 1.

A system control circuit 31 equipped with a microcomputer (CPU) is connected with a host computer 2 in the outside through an interface 32. As the interface 32, in the embodiment, a small computer system interface (SCSI) that is an interface standard by American National Standards Institute (ANSI) may be used.

Moreover, control signals are supplied to the spindle clock generation circuit 13 and the feed servo circuit 24 from the system control circuit 31.

Then, in the embodiment, an error signal from the tracking servo circuit 25 is supplied to the system control circuit 31 through an error signal slicer 33, and an output of the RF amplifier 26 is supplied to an address area detection circuit 34, and then an address area and a data area are distinguished. Then, an output of the address area detection circuit 34 is supplied to the system control circuit 31.

Moreover, an output of the RF amplifier 26 is commonly supplied to an address decoder 36 and a phase-locked loop (PLL) 37 through an address slicer 35. A control signal is supplied to the PLL 37 from the system control circuit 31, and an output of the PLL 37 is supplied to the address decoder 36, and further an output of the decoder 36 is supplied to the system control circuit 31.

On the optical disc 1 used in the present embodiment, the fact that data is recorded in conformity with the ZCAV system is written in the user control information area on the innermost periphery (lead-in area). The information of the recording system is taken into the system control circuit 31 when the optical disc 1 is loaded in the drive of an optical disc.

In case of the latter, at the time of recording, a command instructing a recording system is output from the host computer 2 through the interface 32 to switch the recording system.

By slicing an output of the RF amplifier 26 at a prescribed level, the address slicer 35 can extract desired address information from the optical disc 1.

The extracted address information is supplied to the PLL 37 to generate a reproducing clock. When the reproducing clock is supplied to the address decoder 36 in a state such that the PLL 37 is locked, the address information is decoded. In other words, the address can be read.

Figure 5:
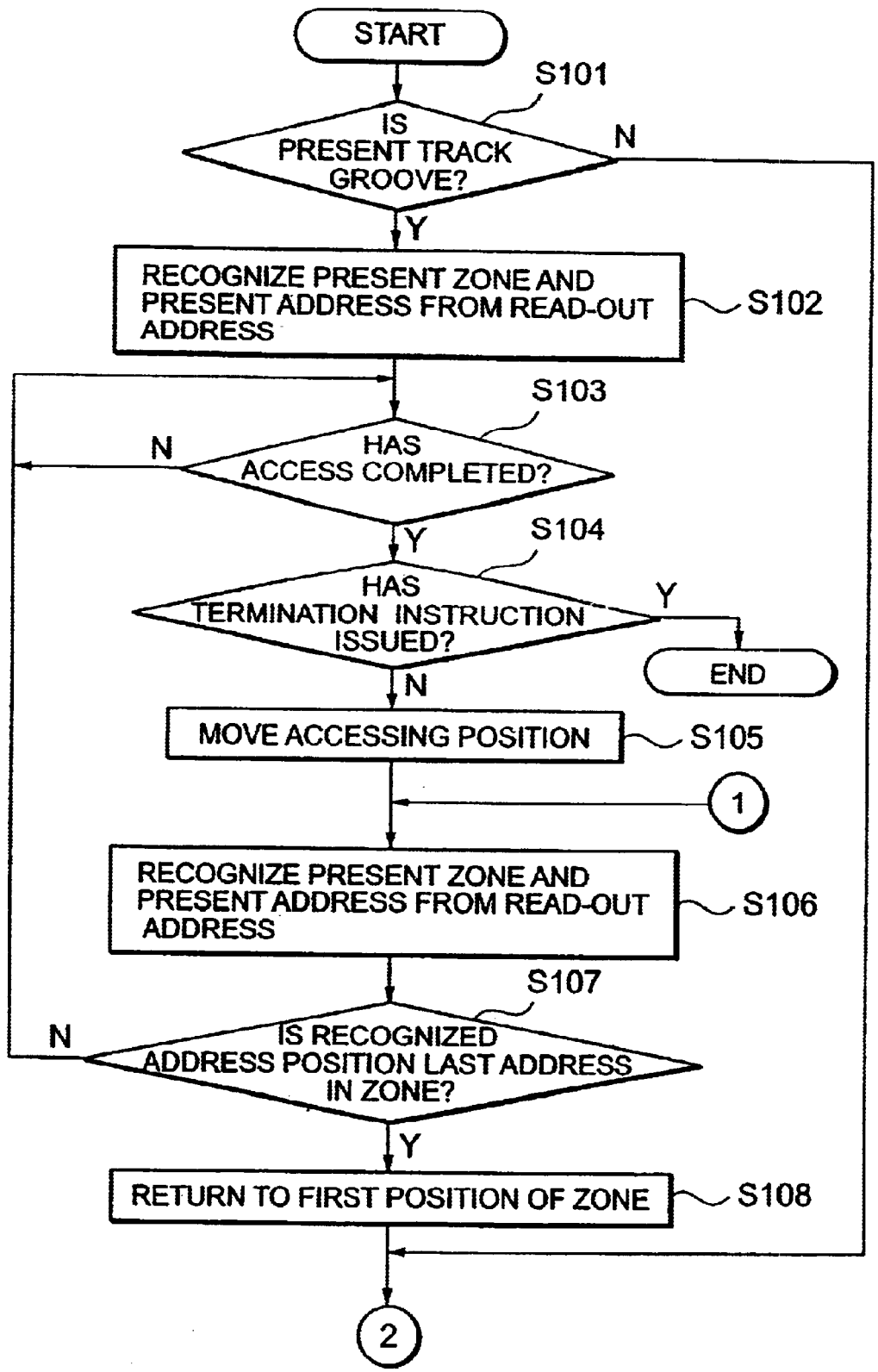
FIG. 5 is a part of a flowchart for illustrating an embodiment of an access method of an optical disc according to the present invention.
Figure 6:
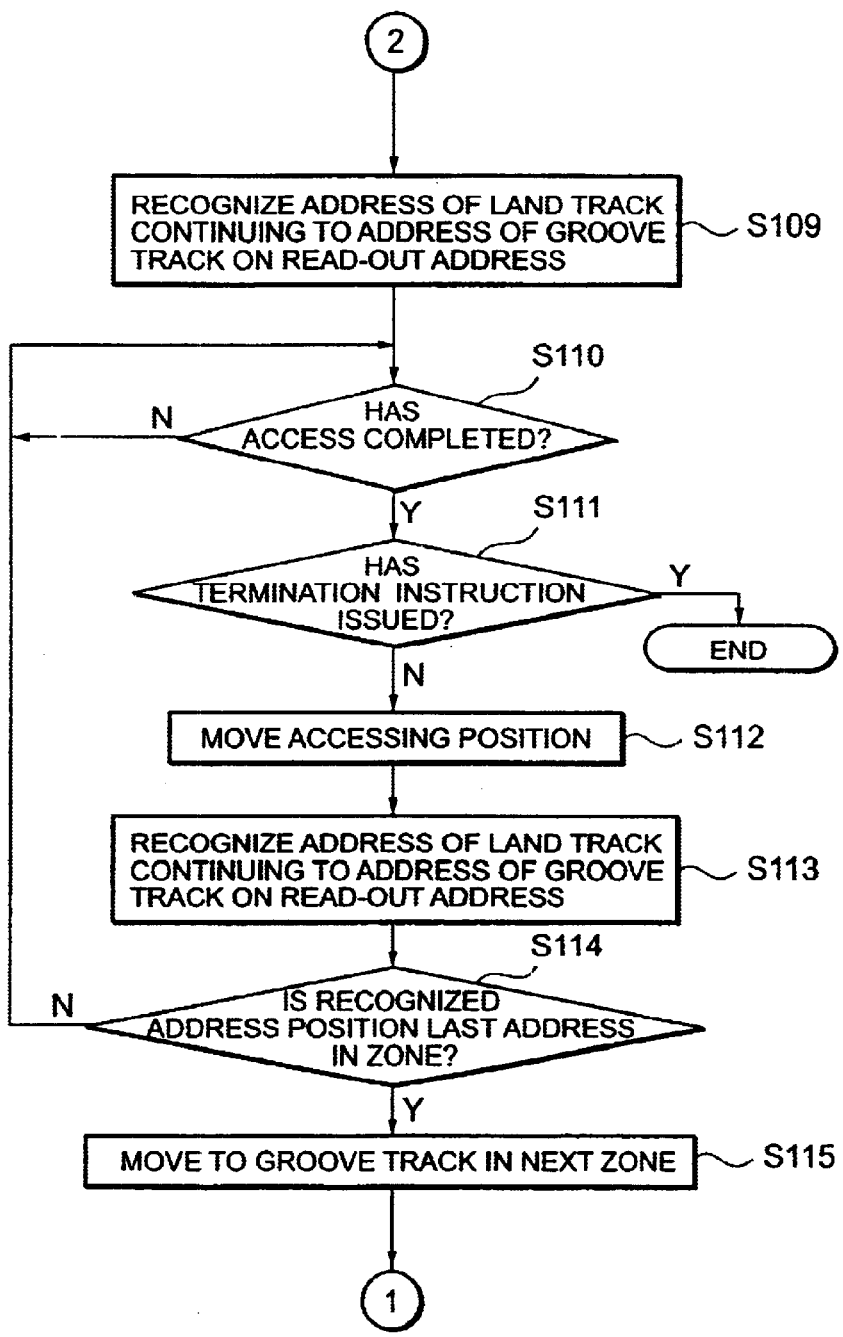
FIG. 6 is the remainder of the flowchart for illustrating the embodiment of the access method of an optical disc according to the present invention.

Next, FIG. 5 and FIG. 6 being the remainder of FIG. 5 are referred while the operation of the embodiment of the access method of an optical disc according to the present invention is described. The flowcharts of FIG. 5 and FIG. 6 show for a case of writing access of data as an example.

First, whether the present track position is a groove track GrT or not is judged (Step S101). When the present track is judged to be a groove track GrT, the present zone, the present track number and the present sector number are recognized on basis of the address information read out from the track (Step S102). Then, when the writing access of the sector data is completed (Step S103), whether an access termination instruction has been issued or not is judged (Step S104). When the termination instruction has been issued, the processing is terminated.

When the access termination instruction has not been issued, an accessing position is moved (Step S105). Then, the address position, i.e. the track number and the sector number, after the movement is recognized (Step S106). It is judged whether the recognized address position is the last address position (the last track number and the last sector number) in the zone or not (Step S107). When the recognized address position is not judged to be the last address position in the zone, the processing returns to Step S103 and the access to the groove tracks GrT is continued.

When the recognized address position is judged to be the last address position of the groove tracks GrT in the zone, the accessing position is moved to the first position of the land tracks LnT in the same zone (Step S108). On the basis of the address information read out from the land track LnT, the address transformation shown in FIG. 3 is performed, and the address of the land tracks LnT continuing to the addresses of the groove tracks GrT (Step S109) is recognized.

Then, when the writing access of sector data to the land tracks LnT is completed (Step S110), whether an access termination instruction has been issued or not is judged (Step S111). When the termination instruction has been issued, the processing is terminated.

When the access termination instruction has not been issued, an accessing position is moved (Step S112). Then, the address position, i.e. the track number and the sector number, after the movement is recognized (Step S113). It is judged whether the recognized address position is the last address position (the last track number and the last sector number) in the zone or not (Step S114). When the recognized address position is not judged to be the last address position in the zone, the processing returns to Step S110 and the access to the land tracks LnT is continued.

When the recognized address position is judged to be the last address position of the land tracks LnT in the zone, the accessing position is moved to the first position of the groove tracks GrT in the next zone (Step S115). After that, the processing advances to Step S106, and repeats the subsequent processing.

[Variations]

Although the aforesaid embodiment concerns the optical disc in the ZCAV system, the present invention can also be applied to an optical disc in the zone constant linear velocity (ZCLV) system.

Moreover, the recording method of address information is not limited to one shown in FIGS. 2A and 2B, but the present invention may also be applied to any cases where address information is recorded so that it can commonly be used in grooves and lands.

Moreover, although the embodiment of the drive shown in FIG. 4 is a drive of a magneto-optical disc, the present invention is not limited to the magneto-optical disc. The present invention may also be applied to a rewritable disc such as a hard disc. The present invention may also be applied to even a read only disc.

Although the present invention has been described in its preferred form with a certain degree of particularity, obviously many changes and variations are possible therein. It is therefore to be understood that the present invention may be practiced than as specifically described herein without departing from scope and the sprit thereof.

What is claimed is:

1. An access method of an optical disc, which is divided into a plurality of zones in a radius direction, and on both of a land track and a groove track of which data can be accessed, and further on which pieces of address information are recorded so that a same piece of address information can be used for any track of the land track and the groove track: wherein said pieces of address information being recorded so that they are successively continuous addresses in each zone and they are discontinuous in order that an address jumping by addresses of a previous zone in an access order thereof becomes a forefront address of a zone next to the previous zone at a beginning of the zone next to the previous zone, said method comprising the steps of:

performing access to either of the land track and the groove track by means of the pieces of address information in each zone;

returning to a first address position in a zone after an address in the either track becomes a last address of the zone;

performing the access by recognizing an address being continued from a last address of the either track suppositionally on the pieces of address information as an address of another track of the land track and the groove track; and moving to a next zone after the address of the other track becomes a last address of the zone.

2. The access method of an optical disc according to claim 1, wherein said optical disc is controlled to rotate at a rotational speed, an angular velocity of which is different in each zone and is constant within a zone, in each zone.

3. A drive of an optical disc, which is divided into a plurality of zones in a radius direction, and on both of a land track and a groove track of which data can be accessed, and further on which pieces of address information are recorded so that a same piece of address information can be used for any track of the land track and the groove track: wherein said pieces of address information being recorded so that they are successively continuous addresses in each zone and they are discontinuous in order that an address jumping by addresses of a previous zone in an access order thereof becomes a forefront address of a zone next to the previous zone at a beginning of the zone next to the previous zone:

said drive of an optical disc comprising control means for controlling operation of said drive of an optical disc, wherein access to either of the land track and the groove track is performed by means of the pieces of address information in each zone:

said drive returns to a first address position in a zone after an address in the either track becomes a last address of the zone:

said drive performs the access by recognizing an address being continued from a last address of the either track suppositionally on the pieces of address information as an address of another track of the land track and the groove track: and said drive moves to a next zone after the address of the other track becomes a last address of a zone.

4. The drive of an optical disc according to claim 3, wherein said optical disc is controlled to rotate at a rotational speed, an angular velocity of which is different in each zone and is constant within a zone, in each zone.

* * * * *